United States Patent
Kim et al.

(10) Patent No.: US 7,756,056 B2
(45) Date of Patent: Jul. 13, 2010

(54) APPARATUS AND METHOD FOR MANAGING QUALITY OF SERVICE IN INTEGRATED NETWORK OF HETEROGENEOUS MOBILE NETWORK

(75) Inventors: Hyung-Sub Kim, Daejon (KR); Yeong-Jin Kim, Daejon (KR); Yeon-Seung Shin, Daejon (KR)

(73) Assignees: Electronics and Telecommunications Research Institute, Daejeon (KR); Samsung Electronics Co., Ltd., Gyeonggi-do (KR)

( * ) Notice: Subject to any disclaimer, the term of this patent is extended or adjusted under 35 U.S.C. 154(b) by 218 days.

(21) Appl. No.: 11/944,875

(22) Filed: Nov. 26, 2007

(65) Prior Publication Data

US 2008/0130656 A1 Jun. 5, 2008

(30) Foreign Application Priority Data

Dec. 1, 2006 (KR) ............ 10-2006-0120832

(51) Int. Cl.
- G01R 31/08 (2006.01)
- G06F 11/00 (2006.01)
- H04L 12/28 (2006.01)
- H04L 12/56 (2006.01)

(52) U.S. Cl. .................. 370/252; 370/395.21
(58) Field of Classification Search .............. None
See application file for complete search history.

(56) References Cited

U.S. PATENT DOCUMENTS

| | | | |
|---|---|---|---|
| 6,721,575 B1 * | 4/2004 | Tarnanen et al. | 455/509 |
| 2005/0033852 A1 * | 2/2005 | Tenhunen | 709/229 |
| 2006/0023657 A1 * | 2/2006 | Woodson et al. | 370/328 |
| 2006/0218302 A1 * | 9/2006 | Chia et al. | 709/245 |
| 2006/0224550 A1 | 10/2006 | Gopisetty et al. | |
| 2007/0053361 A1 * | 3/2007 | Chen et al. | 370/392 |
| 2007/0201366 A1 * | 8/2007 | Liu | 370/235 |
| 2008/0293413 A1 * | 11/2008 | Sharif-Ahmadi et al. | 455/435.1 |

FOREIGN PATENT DOCUMENTS

| | | |
|---|---|---|
| KR | 1020040075307 | 8/2004 |
| KR | 1020050116789 | 12/2005 |
| KR | 1020060042783 | 5/2006 |
| KR | 1020060070297 | 6/2006 |

OTHER PUBLICATIONS

Wei Zhuang, et al., "Policy-Based QoS Management Architecture in an Integrated UMTS and WLAN Environment;" IEEE Communications Magazine, pp. 118-125, Nov. 2003.
KIPO Notice of Patent Grant dated Mar. 31, 2008 for the corresponding application KR 10-2006-0120832.

* cited by examiner

Primary Examiner—Chirag G Shah
Assistant Examiner—Ashley L Shivers
(74) Attorney, Agent, or Firm—Ladas & Parry LLP

(57) ABSTRACT

An apparatus and method for managing QoS in an integrated network system are provided. The apparatus includes: an information provider, a condition calculator, a policy deciding unit, and a resource allocator. The information provider is for providing policy information based on a network equipment control algorithm, a user profile and network information. The condition calculator is for calculating conditions that are used for selecting a policy based on the user profile and the network information received from the information provider. The policy deciding unit is for deciding a network equipment control algorithm in accordance with the conditions, receiving the policy information corresponding to the decided network equipment control algorithm from the information provider, and requesting resource allocation. The resource allocator is for receiving the request of resource allocation from the policy deciding unit and allocating resources.

12 Claims, 2 Drawing Sheets

APPARATUS AND METHOD FOR MANAGING QUALITY OF SERVICE IN INTEGRATED NETWORK OF HETEROGENEOUS MOBILE NETWORK

CROSS-REFERENCE TO RELATED APPLICATIONS

The present invention claims priority of Korean Patent Application No. 10-2006-0120832, filed on Dec. 1, 2006, which is incorporated herein by reference.

BACKGROUND OF THE INVENTION

1. Field of the Invention

The present invention relates to an apparatus and method for managing quality of service (QoS) in an integrated network system; and, more particularly, to an apparatus and method for effectively managing QoS in an integrated network system by calculating conditions that are based of a policy using a user profile and network information, deciding a network equipment control algorithm using the calculated conditions, and processing a service using a policy corresponding the decided network equipment control algorithm in a $3^{rd}$ generation (3G) mobile communication system that is operated by various radio access technologies (RAT).

This work was supported by the Information Technology (IT) research and development program of the Korean Ministry of Information and Communication (MIC) and the Korean Institute for Information Technology Advancement (IITA) [2005-S-404-22, "Research and development on 3G long-term evolution access system"].

2. Description of Related Art

Throughout the specification, a 3GPP long term evolution (LTE) system will be described as an example of an integrated network system.

The $3^{rd}$ generation partnership project (3GPP), the international standard organization, introduced 3GPP long term evolution (LTE). The 3GPP LTE is a name given to a project to improve a current mobile communication system to a new $3^{rd}$ generation mobile communication system to cope with future requirements. Related mobile communication standard has been in progress by the 3GPP.

Unlike a general system where a $3^{rd}$ generation single network independently exists, it is expected that a user's demand for QoS will be more complicated in a future mobile communication system. Particularly, the mobility support has been receiving attention as one of major issue for enabling users to travel through various heterogeneous systems with one terminal. Even in the 3GPP LTE, there have been many studies in progress for supporting the mobility.

It is expected that a 3GPP LTE system will have an integrated network structure where a mobile communication network and a wired network are integrated. In the integrated network, a mobile communication network, x digital subscriber line (xDSL), wired home network, public switched telephone network (PSTN), and hot spot based wireless network mutually operate. Such a wired and wireless integrated network may use Internet protocol to mutually operate.

In the internet, services are generally provided based on a best-effort transmission scheme. The best-effort transmission scheme is not sufficient to satisfy further complicated QoS demands. In order to satisfy further complex QoS demands, integrated services (IntServ) scheme, a differentiated services (DiffServ) scheme, a Next Step in Signaling (NSIS) scheme, a Multi-Protocol Label Switching (MPLS) scheme were introduced. Such schemes are a method for guaranteeing QoS in a wireless IP network. These schemes will be described, hereinafter.

The IntServ scheme describes the characteristics of traffic and service requirements and provides QoS for each service session based on the description in order to provide point-to-point QoS for various IP applications. Also, the IntServ scheme performs a signaling procedure using a resource reservation protocol (RSVP) for reserving resources according to user's QoS requirement and transmits user traffic.

An application to establish connection starts a RSVP procedure for reserving resources and transfers requested RSVP QoS request information to a policy control module and an admission control module. Then, the admission control module decides whether corresponding resources are allocated or not based on the requested QoS information, and a RSVP process module interacts with the policy control module for confirming a permission of a user requesting the corresponding resources.

After the policy control module and the admission control module end the resource allocation confirm procedure, the RSVP processor module sets a parameter for a QoS service requested from a packet classifier and a packet scheduler. The packet classifier sorts data packets belonging to different QoS classes, and the packet scheduler performs a scheduling function of packets outputted according to the QoS parameter set by the RSVP processor.

The DiffServ scheme was introduced to compensate the problem of the IntServ scheme. The DiffServ scheme provides distinct services by classifying packets according to a class of traffic at an edge node of a network. The state of traffic is managed only at the edge node of a network, and a router on a path does not include resource reservation information.

Also, the DiffServ scheme has more scalability than the IntServ scheme because routers in a core network perform scheduling and buffer managing functions for one aggregated flow by gathering a plurality of flows.

Since the DiffServ scheme does not include a signaling procedure for one-to-one QoS, the complexity of the DiffServ scheme is lower than the IntServ scheme and the RSVP scheme.

The MPLS scheme is a mechanism applying connection oriented used in an asynchronous transfer mode (ATM) network and a frame relay network to an Internet using a hop by hop transmission scheme. The MPLS scheme sets a virtual circuit using a signaling protocol before data packet is transmitted and provides QoS mechanisms transmitting user data traffic.

Such a MPLS scheme inserts a fixed length of a label to a packet header and transmits the packet. A label switching router (LSR) receives the packet, and performs routing by deciding a next hop through the header of the received packet. On MPLS domain, the transmission path of packets is defined as a label switched path (LSP), and a LSP is decided by setting a label value at the first LSR.

Finally, the basic concept of the MPLS is a forwarding structure through exchanging labels by interacting with different control modules, and each control module allocates and distributes labels.

The NSIS scheme is a field that related standards has been developed by 'IETF NSIS WG'. The NSIS scheme is an IP signaling protocol system for providing guaranteed QoS in an IP network that provides services in the best effort scheme.

Although NSIS protocol was defined as a signaling protocol for end-to-end QoS that reuses a proper part of initial RSVP, the NSIS protocol has been redefined to a protocol setting constant state information to various constituent elements in a network. Accordingly, the NSIS protocol is hierarchically divided into a NSIS transport layer protocol (NTLP) as a common transfer protocol and a NSIS signaling layer protocol (NSLP) which is a signaling protocol by application such as QoS application, and middle box control application such as firewall.

As described above, the NSIS scheme includes a NTLP layer and a NSLP layer. The NTLP layer is a common part for various NSIS application signaling protocols and operates as a transfer layer to transfer. The application protocol of the NTLP includes a resource reservation protocol for QoS and a middle box control protocol for setting traffic to pass middle box on a network path, such as a network address translator (NAT) and a firewall (FW).

The NSIS scheme defines new state information setting in any form in network equipment as an application of a signaling protocol, for example, resource reservation for QoS, and flow setting for passing NAT/FW.

Finally, signaling application protocols are commonly referred as a NSLP. Such NSIS has generally two layer structure.

Although such conventional technologies can effectively manage and provide QoS using a method evolved from the best-effect service providing scheme, its target object is only a wired IP network, and has constraint in flexibility. Therefore, it is difficult to apply such conventional technologies to heterogeneous integrated system.

In order to overcome such shortcoming, a policy based network management (PBNM) was introduced for quarantining and easily managing complicated and various QoS.

The PBNM introduced by IETF is a network management scheme for effectively managing QoS. The basic policy defined by the PBNM as follow.

'If condition, then action'

It means management/operation based on policy. A predetermined operation is performed for a previously defined condition. In order to perform such operations, numerous and various conditions and operations are defined previously.

However, it is not easy to build huge amounts of data before a system operates. Although policies are prepared for maximum predictably situations, some unpredictable events will occur. In this case, a network operator makes a new policy. If a policy for a generated event is not prepared previously, the closest policy is used. If the closest policy is not proper, a new policy is derived in real time through learning.

The PBNM includes a policy decision point (PDP), a policy repository (PR), and a policy enforcement point (PEP).

The PBNM will be described in more detail.

The PDP decides a policy. That is, if a predetermined event occurs, the PDP decides an optimal policy in consideration of various variables. The policy is defined according to conditions before event occurs. The PR stores the policy.

That is, when a predetermined event is generated, the PTP makes policy candidate groups in consideration of corresponding variables and selects the optimal policy from the policy candidate groups. Such policies may be embodied as database, and can be searched in the PR.

The decided policy is transferred to a network constituent element and instructs the network constituent element to perform a predetermined action. The PEP performs a sequence of operations defined according to the policy decision. Herein, the PDP, the PEP, and the PR denote only conceptual functions. These are not newly added physical units on a network.

In LTE standard introduced by 3GPP, Policy and Charging Rule Function (PCRF) was introduced. The PCRF performs a function similar to the PDP. That is, the PCRF manages policies for managing and providing QoS and manages billing. The basic concept was developed from Internet Engineering Task Force (IETF). However, a procedure for deciding a policy for managing QoS is not clearly described. Also, a procedure for interacting with the PR and the PER until policy is valid, is not described neither. Furthermore, the PR or the PEP was not described at all.

Therefore, there is a demand for developing a method for newly defining the functions of the PR and the PEP and deriving a real policy through interacting with the PR and the PEP in an integrated network such as a 3GPP LTE system using Policy and Charging Rule Function (PCRF).

SUMMARY OF THE INVENTION

An embodiment of the present invention is directed to providing an apparatus and method for effectively managing QoS in an integrated network system by calculating conditions that will be bases of a policy using a user profile and network information, deciding a network equipment control algorithm using the calculated conditions, and processing a service using a policy corresponding the decided network equipment control algorithm in a $3^{rd}$ generation (3G) mobile communication system that is operated by various radio access technologies (RAT).

In accordance with an aspect of the present invention, there is provided an apparatus of managing quality of service (QoS) in an integrated network system, including: an information provider for providing policy information based on a network equipment control algorithm, a user profile and network information; a condition calculator for calculating conditions that are used for selecting a policy based on the user profile and the network information received from the information provider; a policy deciding unit for deciding a network equipment control algorithm according to the conditions, receiving the policy information corresponding to the decided network equipment control algorithm from the information provider, and requesting resource allocation; and a resource allocator for receiving the request of resource allocation from the policy deciding unit and allocating resources.

In accordance with another aspect of the present invention, there is provided a method for managing quality of service (QoS) in an integrated network system including: at a information provider, providing a user profile and a network information in accordance with a user profile request signal; at a condition calculator, calculating conditions that are used for selecting a policy based on the user profile and the network information; at a policy decision unit, deciding a network equipment control algorithm based on the calculated conditions; at the policy decision unit, forwarding a request signal for policy information corresponding to the decided network equipment control algorithm; at the policy decision unit, receiving the policy information in accordance with the request signal from the information provider; and at a resource allocator, allocating resources for the received policy information.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
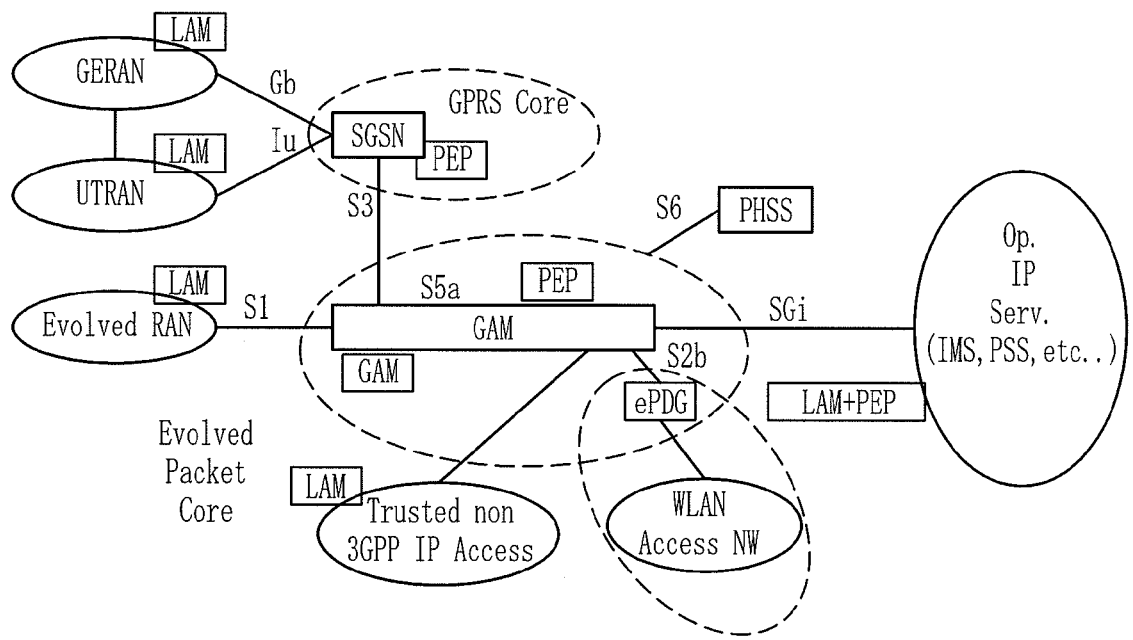
FIG. 1 is a diagram illustrating a 3GPP LTE system where the present invention is applied.

FIG. 1 is a diagram illustrating a 3GPP LTE system where the present invention is applied.

As shown in FIG. 1, the 3GPP LTE system includes a plurality of heterogeneous access systems such as GERAN, UTRAN, Evolved RAN, Trusted non 3GPP IP Access, and WLAN Access NW, a location access manager (LAM) for managing the quality of service (QoS) in each access system and the resources of each access system, a global access manager (GAM) for calculating conditions that will be based on a policy using a user profile and network information, deciding a network equipment control algorithm using the calculated condition, and processing a service using a policy corresponding to the decided network equipment control algorithm, and a policy and home subscriber server (PHSS) for managing a policy and a user profiled.

If an apparatus for managing QoS in an integrated network system according to the present embodiment is embodied as a form of the local access manager (LAM) in a single network, the LAM manages mobility and resources in each of heterogeneous access systems as a manager of an access system, and the GAM supports a service in a view of a network and integrally manages system information for effectively managing networks as a manager of an integrated network system.

Figure 2:
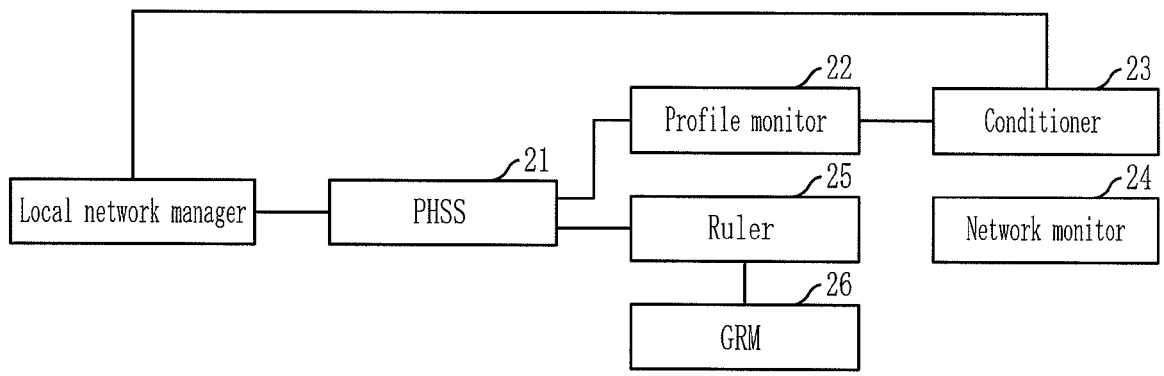
FIG. 2 is a block diagram depicting an apparatus for managing quality of service in an integrated network system in accordance with an embodiment of the present invention.

FIG. 2 is a block diagram depicting an apparatus for managing quality of service in an integrated network system in accordance with an embodiment of the present invention.

As shown in FIG. 2, the apparatus for managing quality of service (QoS) in an integrated network system according to the present embodiment includes a policy and home subscriber server (PHSS) 21, a profile monitor 22, a conditioner 23, a network monitor 24, a ruler 25, and a global resource manager (GRM) 26.

The PHSS 21 receives a request of a user profile from a local network manager and transfers a corresponding user profile to the profile monitor 22. The PHSS 21 also receives a request of a policy from the ruler 25 and provides a corresponding policy to the ruler 25.

The profile monitor 22 receives the requested user profile from the PHSS 21 and transfers the received user profile to the conditioner 23.

The conditioner 23 receives the user profile from the profile monitor 22, determines whether a service is subscribed or not using the received user profile, and transfers the user profile to a local network manager. The conditioner 23 also calculates conditions that is based on a policy using the received user profile and the network information from the network monitor 24 and transfers the calculated condition to the ruler 25.

The network monitor 24 transfers network information to the conditioner 23.

The ruler 25 decides a network equipment control algorithm according to the conditions from the conditioner 23, requests a corresponding policy according to the decided network equipment control algorithm to the PHSS 21, receives the corresponding policy from the PHSS 21, and requests the GRM 26 to allocate resources.

The GRM 26 receives the request of resource allocation from the ruler 25, checks available resources, and allocates the resources.

Herein, the network monitor 24 obtains network information including the interference degree and the noise level of a network at a predetermined time.

The profile monitor 22 provides information about whether a user is registered to a predetermined system or not, whether a predetermined service is subscribed or not, preference, and a speed of a mobile terminal.

When a user requests a predetermined service to use, the ruler 25 decides whether the request of the user is approved or not. The ruler 25 also controls a handover process when a user requests handover.

The apparatus for managing QoS in an integrated network system according to the present embodiment can overcome the large amount of load and delay for processing signals which are the shortcomings of a QoS managing apparatus according to the related art due to too many interfaces caused by function distribution.

Figure 3:
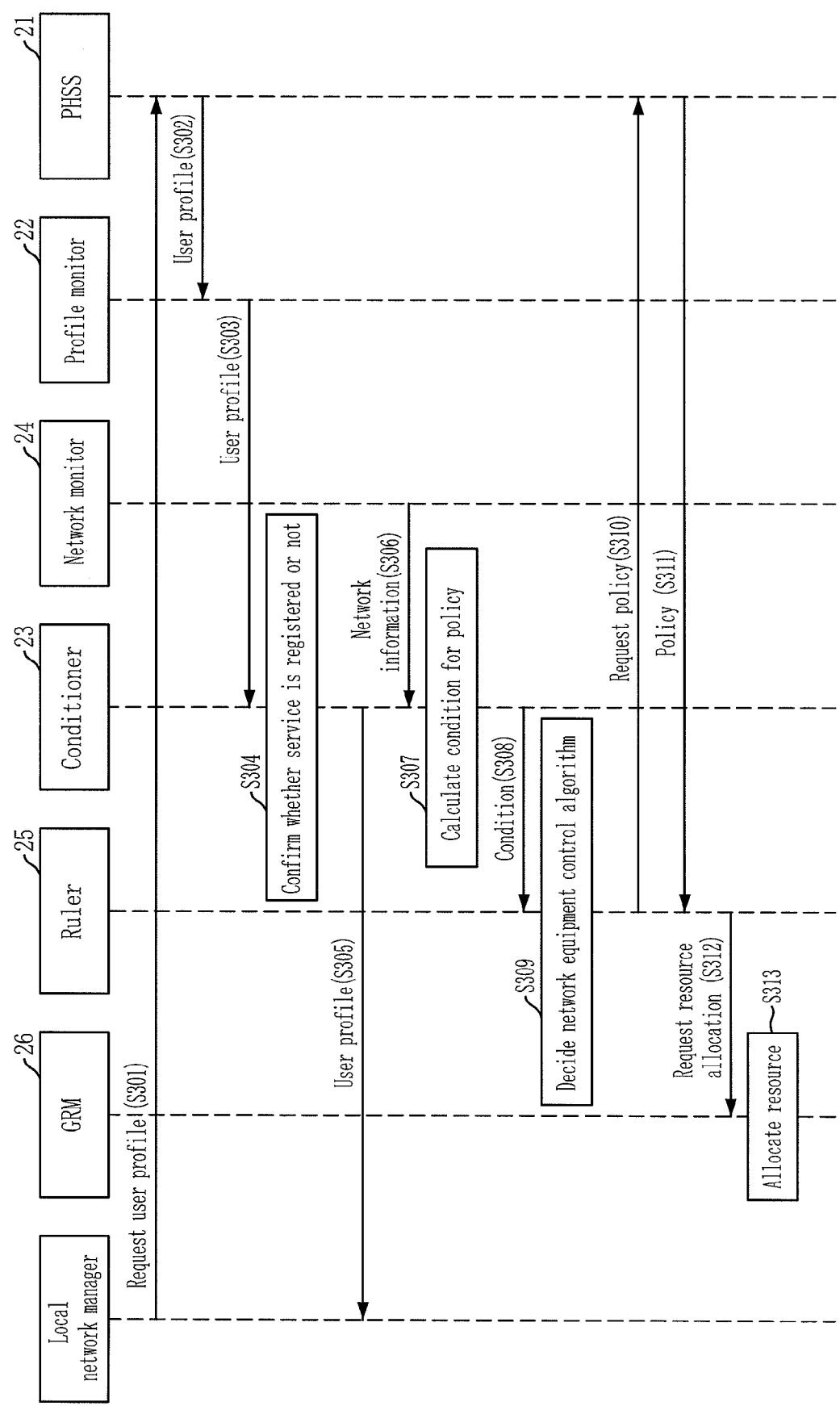
FIG. 3 is a flowchart of a method for managing quality of service in an integrated network system in accordance with an embodiment of the present invention.

FIG. 3 is a flowchart of a method for managing quality of service in an integrated network system in accordance with an embodiment of the present invention.

At step S301, a policy and home subscriber server (PHSS) 21 receives a request of a user profile from a local access manager (LAM).

At step S302, the PHSS 21 transfers the requested user profile to the profile monitor 22.

At step S303, the profile monitor 22 transfers the received user profile to the conditioner 23.

At steps S304 and S305, the conditioner 23 checks whether a user subscribes a related service or not and transfers the received user profile to a corresponding network manager.

At step S306, the network monitor 24 collects network information and transfers the collected network information to the conditioner 23.

At step S307, the conditioner 23 calculates conditions that will be the basis of a policy using the network information from the network monitor 24 and the received user profile from the profile monitor 22.

At steps S308 to 310, the ruler 25 decides a network equipment control algorithm based on the calculated conditions from the conditioner 23 and requests a corresponding policy according to the decided network equipment control algorithm to the PHSS 21.

At step S311, the PHSS 21 searches a corresponding policy and transfers the searched policy to the ruler 25. If the PHSS 21 does not include the corresponding policy, the PHSS 21 may receive the corresponding policy from an external device.

At step S312, the ruler 25 requests the GRM 26 to allocate resources.

At step S313, the GRM 26 allocates resources in order to process a corresponding service if related network resources are available. Herein, a user is enabled to be informed about the policy information by transmitting the policy information to a corresponding network manager.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, conditions that will be basis of a policy are calculated using a user profile and network information, a network equipment control algorithm is decided using the calculated conditions, and a related service is processed using a policy corresponding to the decided network equipment control algorithm in the apparatus and method for managing QoS in an integrated network system according to an embodiment of the present invention. Therefore, the QoS can be effectively managed.

While the present invention has been described with respect to certain preferred embodiments, it will be apparent to those skilled in the art that various changes and modifications may be made without departing from the spirits and scope of the invention as defined in the following claims.

What is claimed is:

1. An apparatus of managing quality of service (QoS) in an integrated network system, comprising:
    a policy and home subscriber server (PHSS) configured to:
        receive a user profile request signal from a local network manager (LNM);
        provide, to a profile manager (PM), a user profile in accordance with the user profile request signal;
        receive, from a ruler, a policy information request signal for policy information corresponding to a decided network equipment control algorithm; and
        send back, to the ruler, policy information in accordance with the policy information request signal from the ruler;
    the PM configured to:
        receive the user profile from the PHSS; and
        transfer the user profile to a conditioner;
    a network monitor configured to:
        send network information to the conditioner;
    the conditioner configured to:
        calculate conditions that are used for selecting a policy based on the user profile and the network information when the conditioner determines that the related service is subscribed to by the user;
    the ruler configured to:
        receive, from the conditioner, the calculated conditions;
        decide on the network equipment control algorithm based on the calculated conditions;
        forward, to the PHSS, the policy information request signal for policy information corresponding to the decided network equipment control algorithm; and
        receive, from the PHSS, the policy information in accordance with the policy information request signal; and
    a global resource manager (GRM) configured to:
        receive, from the ruler, a request resource allocation message in accordance with the received policy information; and
        allocate resources in accordance with the forwarded request resource allocation message from the ruler.

2. The apparatus of claim 1, wherein the PHSS is configured to provide a predetermined user profile corresponding to the request of the user profile from a local network manager, and configured to provide a predetermined policy information corresponding to the decided network equipment control algorithm.

3. The apparatus of claim 2, wherein the conditioner is configured to check whether or not a user subscribes to a related service in accordance with the user profile.

4. The apparatus of claim 1, wherein the profile monitor is configured to provide information on whether or not the user is registered to a predetermined system, whether or not a predetermined service is subscribed, preference, and a speed of a mobile terminal.

5. The apparatus of claim 1, wherein the network information includes interference degree and noise level of a predetermined network at a predetermined time.

6. A method for managing quality of service (QoS) in an integrated network system, comprising:
    receiving a user profile request signal at a policy and home subscriber server (PHSS) from a local network manager (LNM);
    providing, from the PHSS to a profile manager (PM), a user profile in accordance with the user profile request signal;
    transferring the user profile from the PM to a conditioner;
    checking, at the conditioner, whether or not a user subscribes to a related service in accordance with the user profile;
    sending network information from a network monitor to the conditioner;
    calculating, at the conditioner, conditions that are used for selecting a policy based on the user profile and the network information when the conditioner determines that the related service is subscribed to by the user;
    transmitting the calculated conditions from the conditioner to a ruler;
    deciding, at the ruler, on a network equipment control algorithm based on the calculated conditions;
    forwarding, from the ruler to the PHSS, a policy information request signal for policy information corresponding to the decided network equipment control algorithm;
    receiving, at the ruler from the PHSS, the policy information in accordance with the policy information request signal;
    acquiring, at a global resource manager (GRM) from the ruler, a request resource allocation message in accordance with the received policy information; and
    allocating resources, using the GRM, in accordance with the forwarded request resource allocation message from the ruler.

7. The method of claim 6, wherein the providing step includes
    providing, from the PHSS to the PM, a predetermined user profile corresponding to the user profile request signal from the LNM; and
    receiving, at the conditioner from the PM, the predetermined user profile.

8. The method of claim 7, wherein the calculating step further includes:
    checking whether or not the user is registered based on the predetermined user profile.

9. The method of claim 7, wherein the transferring step provides a speed of a mobile terminal.

10. The method of claim 7, wherein the network information includes interference degree and noise level of a predetermined network at a predetermined time.

11. A non-transitory computer readable recording medium for managing quality of service (QoS) in an integrated network system, the computer readable recording medium having coded computer instructions comprising:
    receiving a user profile request signal at a policy and home subscriber server (PHSS) from a local network manager (LNM);
    providing, from the PHSS to a profile manager (PM), a user profile in accordance with the user profile request signal;
    transferring the user profile from the PM to a conditioner;

checking, at the conditioner, whether or not a user subscribes to a related service in accordance to the user profile;

sending network information from a network monitor to the conditioner;

calculating, at the conditioner, conditions that are used for selecting a policy based on the user profile and the network information when the conditioner determines that the related service is subscribed to by the user;

transmitting the calculated conditions from the conditioner to a ruler;

deciding, at the ruler, on a network equipment control algorithm based on the calculated conditions;

forwarding, from the ruler to the PHSS, a policy information request signal for policy information corresponding to the decided network equipment control algorithm;

receiving, at the ruler from the PHSS, the policy information in accordance with the policy information request signal;

acquiring, at a global resource manager (GRM) from the ruler, a request resource allocation message in accordance with the received policy information; and allocating resources using the GRM in accordance with the forwarded request resource allocation message from the ruler.

12. The non-transitory computer readable recording medium of claim 11 wherein the computer readable recording medium is selected from a group consisting of a read-only memory (ROM), a random-access memory (RAM), a CD-ROM, a floppy disk, a hard disk, and an optical magnetic disk.

* * * * *